(12) United States Patent
Wienand et al.

(10) Patent No.: US 6,746,150 B2
(45) Date of Patent: Jun. 8, 2004

(54) SENSOR FOR DETECTING THE TEMPERATURE OF A FLUID

(75) Inventors: Karl-Heinz Wienand, Aschaffenburg (DE); Matthias Muziol, Seligenstadt (DE)

(73) Assignee: Heraeus Electro-Nite International N.V., Houthalen (BE)

( * ) Notice: Subject to any disclaimer, the term of this patent is extended or adjusted under 35 U.S.C. 154(b) by 10 days.

(21) Appl. No.: 09/896,354

(22) Filed: Jun. 29, 2001

(65) Prior Publication Data

US 2002/0006155 A1 Jan. 17, 2002

(30) Foreign Application Priority Data

Jun. 30, 2000 (DE) .......................... 100 31 124

(51) Int. Cl.$^7$ ................................ G01K 7/00
(52) U.S. Cl. .................. 374/208; 374/148; 374/183; 374/185
(58) Field of Search ................ 374/183, 148, 374/185, 208, 146

(56) References Cited

U.S. PATENT DOCUMENTS

| | | | | |
|---|---|---|---|---|
| 4,447,799 A | * | 5/1984 | Carlson | 29/613 |
| 4,516,106 A | * | 5/1985 | Nolting et al. | 338/28 |
| 4,548,780 A | * | 10/1985 | Krohn | 264/272.15 |
| 5,137,616 A | * | 8/1992 | Poor et al. | 204/428 |
| 5,410,291 A | * | 4/1995 | Kuzuoka | 338/22 R |
| 5,660,473 A | * | 8/1997 | Noma et al. | 374/145 |
| 5,697,706 A | * | 12/1997 | Ciaravino et al. | 374/166 |
| 5,743,646 A | * | 4/1998 | O'Connell et al. | 374/148 |
| 5,753,835 A | * | 5/1998 | Gustin | 73/866.5 |
| 6,286,995 B1 | * | 9/2001 | Takahashi et al. | 374/148 |
| 6,297,723 B1 | * | 10/2001 | Shoji et al. | 338/229 |
| 6,305,841 B1 | * | 10/2001 | Fukaya et al. | 374/185 |
| 6,341,892 B1 | * | 1/2002 | Schmermund | 338/22 R |
| 2002/0071475 A1 | * | 6/2002 | Betzner et al. | 374/185 |

FOREIGN PATENT DOCUMENTS

| | | | |
|---|---|---|---|
| DE | 33 16 995 A1 | 11/1984 | |
| DE | 39 39 165 C1 | 10/1990 | |
| EP | 0 364 579 A1 | 4/1990 | |
| EP | 0 794 417 A1 | 9/1997 | |
| JP | 57196122 A | * 12/1982 | G01K/7/22 |
| JP | 61142430 A | * 6/1986 | G01K/7/00 |
| JP | 01023130 A | * 1/1989 | G01K/7/22 |
| WO | WO 93/09416 A1 | 5/1993 | |

* cited by examiner

Primary Examiner—Diego Gutierrez
Assistant Examiner—Lydia M. De Jesus
(74) Attorney, Agent, or Firm—Akin Gump Strauss Hauer & Feld, LLP

(57) ABSTRACT

For detecting the temperature of a fluid, particularly a flowing liquid or gaseous medium, in the hollow space of a housing, a temperature-measuring element is provided that can be connected to an evaluation device via a plug arrangement and is arranged in a protective tube of a sensor housing, which is closed on one side, and with a connection piece firmly affixed thereto. The protective tube projects at least with its tip into an opening of the hollow space that is sealed off from the outside atmosphere using an elastic O-ring. The temperature-measuring element is arranged in the region of the tip of the protective tube on one end of a longitudinally extending circuit board and is connected via strip conductors to the plug arrangement that leads to the outside. The plug arrangement is surrounded by a screw sheath of the sensor housing, which is firmly connected to the protective tube and is provided with a threading that projects into the housing of the hollow space for the purpose of mounting.

7 Claims, 3 Drawing Sheets

SENSOR FOR DETECTING THE TEMPERATURE OF A FLUID

BACKGROUND OF THE INVENTION

The invention relates to a sensor for detecting the temperature of a fluid, in particular a flowing liquid or gaseous medium, in the hollow space of a housing. A temperature measuring element, connectable to an evaluation device via a plug arrangement, is arranged in a protective tube of a sensor housing, which is closed on one end, with a firmly inserted connection piece. The protective tube projects at least partially into an opening of the hollow space of the housing that is sealed off from the outside atmosphere using an elastic O-ring.

From German published patent application DE 33 16 995 A1, a temperature detection device is known with a temperature sensor, that is held in a housing and projects with its measurement region out of one end of the housing. Means are provided for attachment of the one end into an opening of a hollow structure containing a liquid or gaseous medium. According to DE 33 16 995 A1, a temperature detection device is provided, which is easy to install even by non-specialized persons and is to be connected securely to an evaluation and display device. A penetration into the allocated housing of a liquid or gaseous medium that impairs the functionality must be prevented to a certain degree.

In order to solve the problem, it is provided according to DE 33 16 995 A1 that a housing constructed as a plastic injection-molded part is formed in two pieces. The temperature sensor held on one end of the one housing piece is enclosed in an airtight manner by the housing piece up to the measurement region and is connected with two pin-shaped contact pieces held in the one housing piece. The other end of the one housing piece is constructed as a plug, to which an available plug receptacle is allocated, which is arranged on one end of the other housing piece that has two socket-shaped contact pieces. A line connected to the evaluation and display device can be supplied via the other end of the other housing piece and equipped so that it can be connected to the socket-shaped contact pieces. The two housing pieces are provided with catch mechanisms in the region of the plug and the plug receptacle for a defined connection. A sealing mechanism is allocated to the two housing pieces in the region of the plug and the plug receptacle for the purpose of preventing the penetration of a liquid or gaseous medium into the contact zone. This involves a relatively expensive construction, which requires a high degree of expertise during construction.

BRIEF SUMMARY OF THE INVENTION

Starting from a screw-in sensor, as known from the above-mentioned DE 33 16 995 A1, an object of the invention is take temperature measurements using a screw-in sensor in fluids, i.e., various liquid or gaseous media. Here, a socket mounted directly on the sensor should be used, especially one according to the German Industrial Standard (DIN) 72585.

This object is achieved according to the invention in that the measuring element is arranged in the region of the tip of the protective tube on one end of a longitudinally extended circuit board and is connected via strip conductors to the plug arrangement positioned on the opposite end of the circuit board. It has proven to be advantageous that with a sensor of this type, a small construction space, a rapid response behavior, and a high vibration-resistance are obtained.

In a preferred embodiment of the invention, the plug arrangement is surrounded by a screw sheath of the sensor housing, which is firmly connected to the protective tube and which is provided with a threading that projects into the housing of the hollow space for the purpose of attachment. Here, the screw sheath has a flange extending in the radial direction, which functions as a pressing surface for an O-ring that seals off the opening of the hollow space-housing. The screw sheath is provided, on its side facing away from the protective tube, with an annular edge arranged coaxially to the screw sheath threading, for attaching a connection piece essentially made out of plastic, wherein plug contacts of the plug arrangement project into the connection piece opened to the outside. Advantageously, the connection piece is arrested against axial shifting by an annular flange of the edge of the screw sheath in its plug-in position.

The sensor thus comprises a screw sheath, which receives a plug arrangement. The edge of the screw sheath is placed around the plug arrangement with the connection piece using a special tool in a work operation, and at the same time, several—for example, three—lock beads are applied to prevent turning. The positioning of the lock beads on the correspondingly provided recesses in the connection piece for the plug arrangement is achieved via an opposing plug that is integrated in the tool, by which the function as well as the insulation of the sensor can be tested simultaneously during pressing. A longitudinally extending circuit board is soldered to the plug arrangement and extends up into the tip of the protective tube and accommodates the measuring element of the temperature sensor.

The functional unit formed by the plug arrangement, screw sheath, and connection piece serves for connection of an external plug for the electrical connection to an evaluation unit and display device (and/or controller) for the temperature signal. Among those skilled in the art, the functional unit is therefore also called a plug socket.

As a temperature-measuring element, a component provided with a connection wires or a surface-mountable component (SMD) can be used, since the necessary connection soldering surfaces are provided for both cases. The temperature-measuring element is, for example, a thin-film platinum element or an NTC-element. It is advantageously embedded in heat-conducting paste, in order to ensure a rapid response. Over the measuring element and the circuit board a shrinkable tube is applied for insulation and for the mechanical protection of the element.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
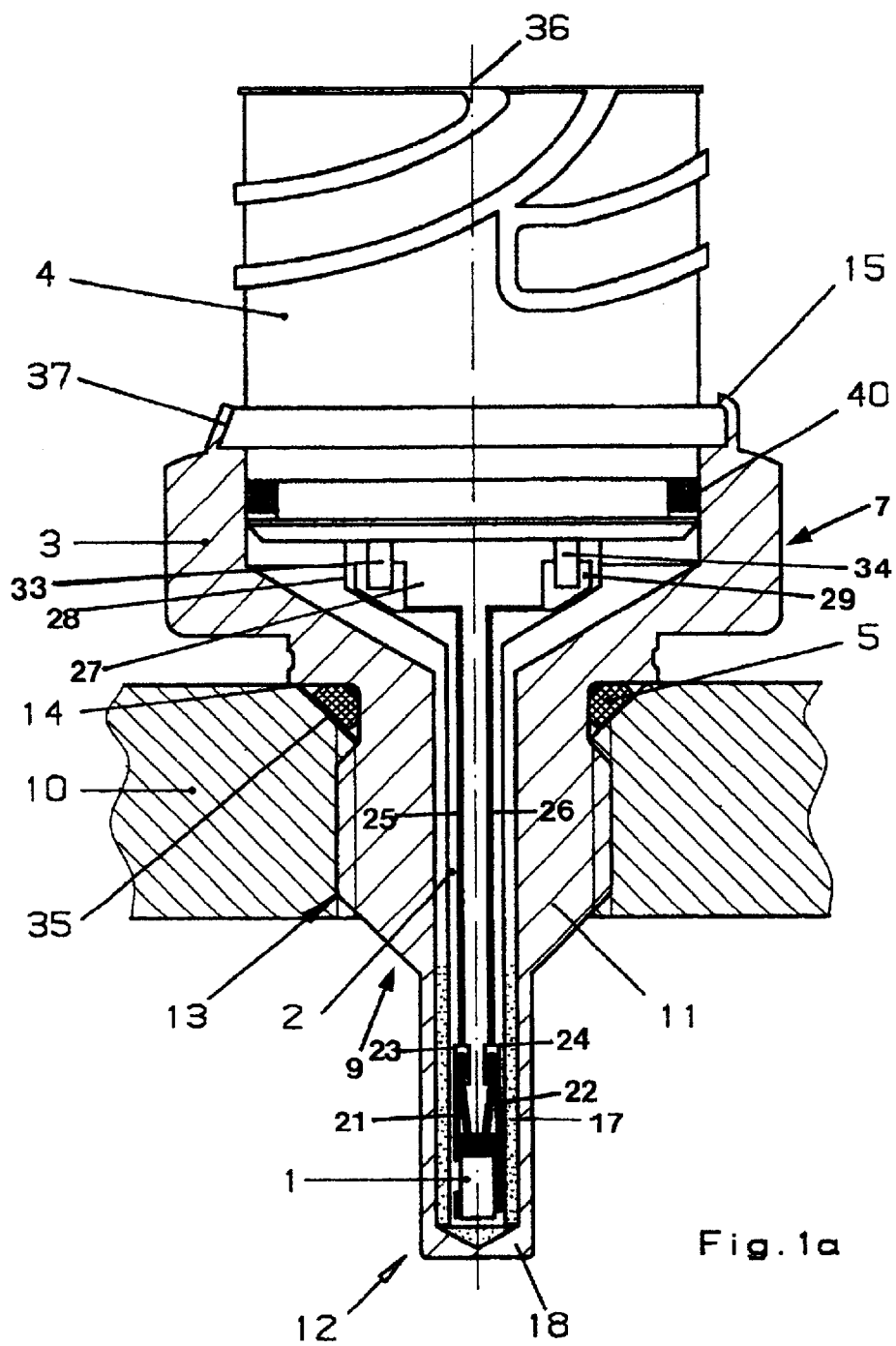
FIG. 1a is a side view, in partial longitudinal section, of a sensor screwed into an opening of a housing located in hollow space and facing the flowing or to be flowed medium with its closed protective tube.

According to FIG. 1a, the sensor 7 has a sensor housing 12 with a protective tube 11, whose closed end 18 faces toward the medium to be measured. In the end region of the protective tube 11, a temperature-sensitive measuring element 1 is arranged on one end of the circuit board 2. The measuring element 1 is connected via connection wires 21, 22 to contact pads 23, 24 of the strip conductors 25, 26 of the circuit board 2, which are soldered on the other end 27 of the circuit board 2 via contact pads 28, 29 to plug contacts 33, 34, as can also be recognized later from FIG. 3. In order to obtain as good a heat transfer as possible between the protective tube 11 and the measuring element 1, heat-conducting paste 17 is inserted in the interior of the protective tube 11.

However, it is also possible to apply a temperature-sensitive measuring element as an SMD component directly on the contact pads on the end of the circuit board 2.

The sensor housing 12 has an outer threading 13 in its middle region, which is screwed into a bore hole 9 of a housing 10 (shown here in fragments) with a hollow threading along a thread axis 36. Here, the sensor housing 12 has, on the side of the housing 10 facing away from the measurement, an annular flange 14, which presses an elastic O-ring 5 (sealing ring) into a hollow cone-shaped tapering section 35—as seen along the thread axis 36 in the screw-in direction—on the housing 10. In this manner, the region surrounding the tip of the protective tube 11 is sealed off hermetically relative to the side of the housing 10 facing away from the measurement. In order to obtain as tight a fitting seal as possible, the sensor housing 12 is constructed as a screw sheath 3 in its region facing away from the measurement, so that screwing the sensor housing 12 into the threading of the bore hole 9 can be done with a wrench.

Inside the region of the screw sheath 3 facing away from the measurement, an annular elastic O-ring 40 is located, which hermetically seals the inner surface of the screw sheath 3, inwardly constructed as a hollow cylinder, relative to a connection piece 4 that projects into the screw sheath, with the help of an annular flange edge 15, so that the interior of the protective tube 11, together with the space for the circuit board 2, is hermetically sealed off from the surrounding atmosphere on the side of the housing 10 facing away from the measurement. The screw sheath 3 is provided on its side facing the connection piece with the annular flange edge 15, which has notches 37, which grasp into corresponding grooves of the connection piece 4 constructed as a plastic body. Because of the surrounding annular flange edge 15 and the notches 37, the connection piece 4 is connected with the sensor housing 12, so that it cannot slip and is secured against turning.

Figure 1B:
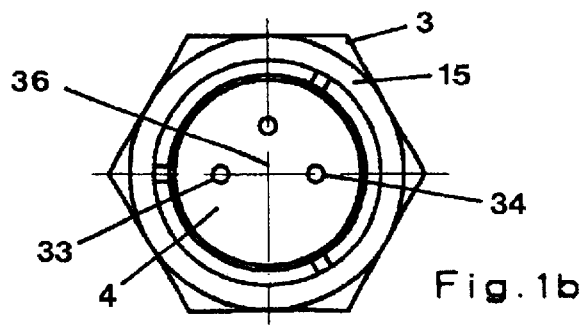
FIG. 1b is an overhead view of the sensor along its longitudinal axis, wherein the plug contacts of the connection piece (as seen from above) can be recognized.

In FIG. 1b an overhead view of the upper region of the screw sheath 3 is recognizable, wherein both the outer periphery of the screw sheath is seen, as well as the flange edge 15 which surrounds the connection piece 4 with the plug contacts 33, 34 recognizable from above. It is thus possible to set plugs and/or test contacts onto the plug contacts 33, 34, as is also explained in the following on the basis of FIGS. 3a, 3b. The axis of the screw sheath 3 corresponds to the thread axis 36.

Figures 2A, 2B, 2C:
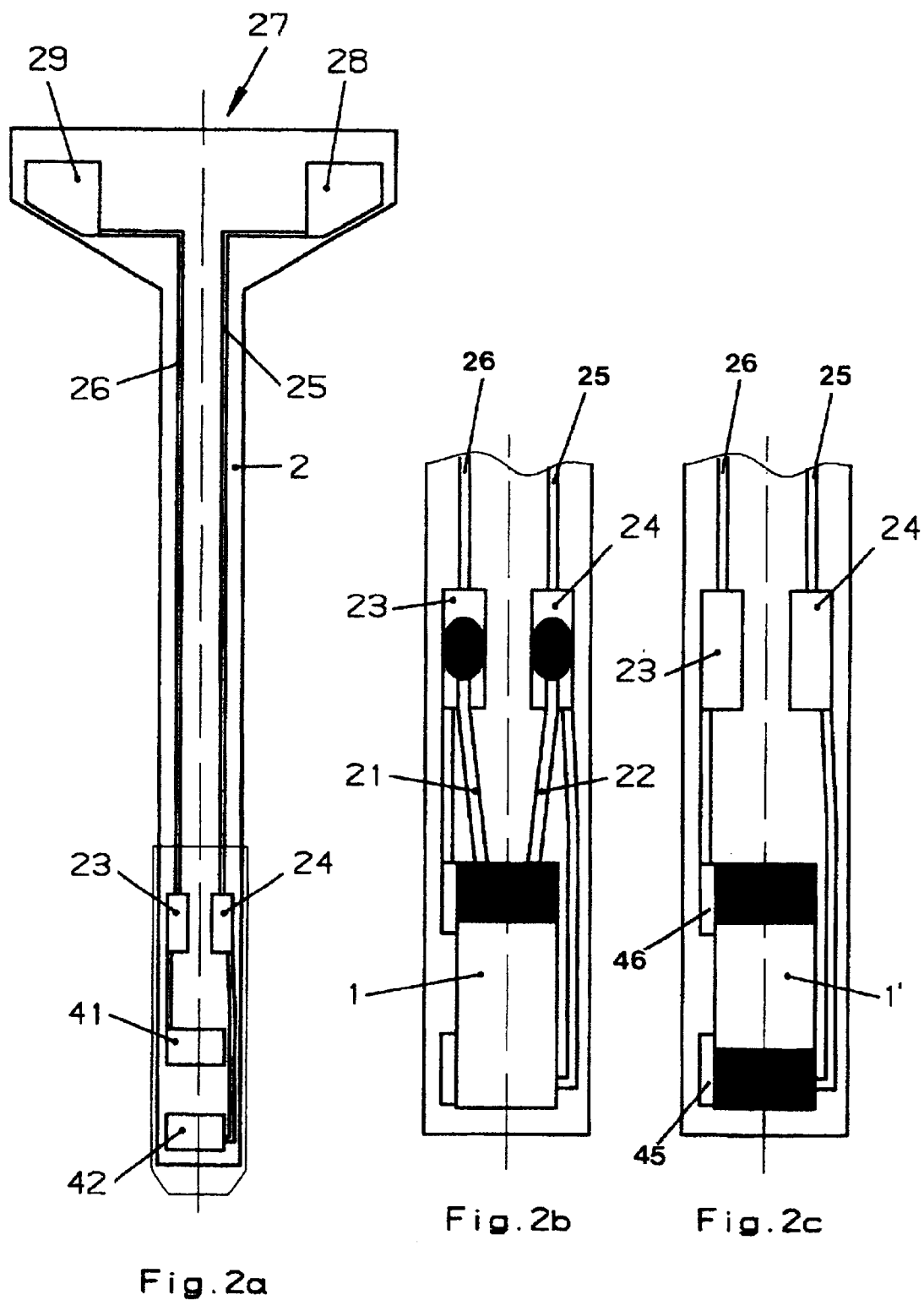
FIG. 2a is a plan view of a circuit board having no components on it, on which the connection contacts for a temperature-measuring element with connection wires and/or with SMD contacts can be recognized.
FIG. 2b is a plan view of a measuring element on a circuit board, which is contacted with connection wires.
FIG. 2c is a plan view of a measuring element mounted by SMD technology.

According to FIG. 2a, the unequipped circuit board 2 (no components on it) has respectively contact pads 41, 42 for electrical and mechanical connection with an SMD measuring element to be mounted, wherein additional connection contact pads 23, 24 are provided, which are provided for the assembly of measuring elements with connection wires.

According to FIG. 2b, it is thus possible to connect, electrically and mechanically firmly, a measuring element 1 via connection wires 21, 22 to the contact pads 23, 24, whereas in FIG. 2c, the possibility of an SMD-mounting using SMD contacts 45, 46 of a measurement element 1' is also shown.

In the representation according to FIG. 2c the connection wires, known from FIG. 2b for the measuring element, can be omitted. From this there results an additional simplification of the manufacturing and the possibility of a miniaturization of sensor elements.

Figure 3A:
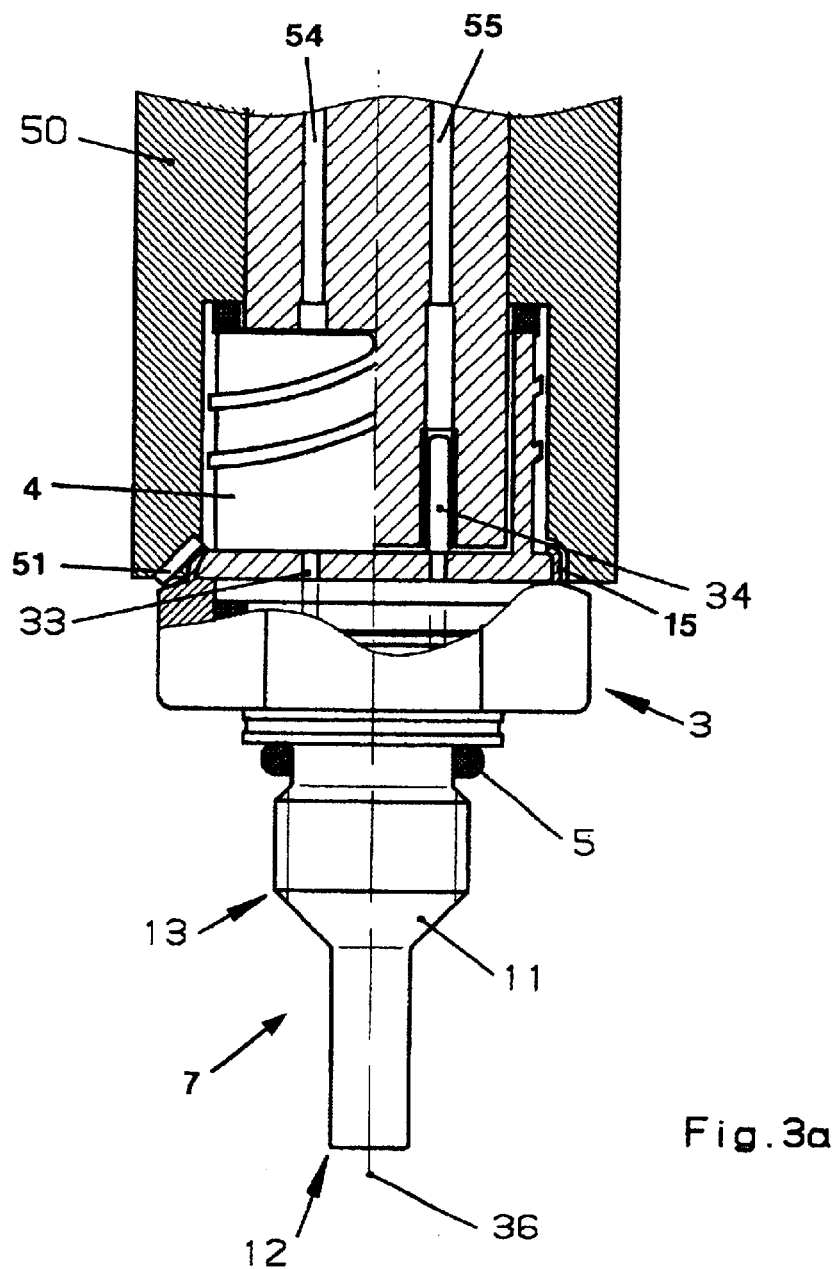
FIG. 3a is a side view, in partial longitudinal section, of a sensor together with a pressing tool, which is later again removed.

According to FIG. 3a, the end of the screw sheath 3 facing away from the measurement is deformed by crimping with the help of a pressing tool 50, to such an extent that the connection piece 4 is held in a form-fit manner by the surrounding flange edge 15 of the screw sheath 3. This means that the connection piece 4 is enclosed on the ring-shaped attachment element by the surrounding flange edge 15. At the same time, using three cylinder pins 51 of the pressing tool 50, rotation locking beads are applied on the periphery of the flange edge 15 into the already present recesses of the substantially plastic constructed connection piece 4, so that a rotation between the connection piece 4 and the screw sheath 3 is no longer possible.

Figure 3B:
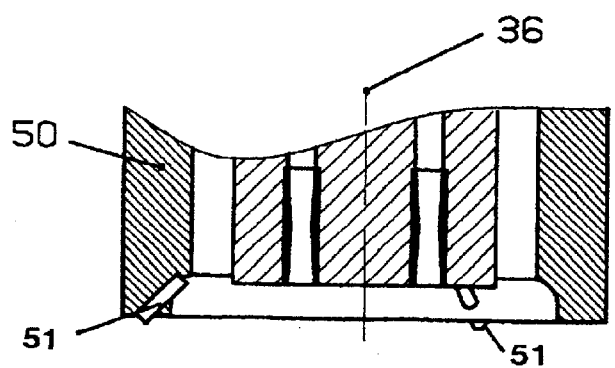
FIG. 3b is an enlarged sectional view of cylinder pins of the pressing tool for formation of rotation-secure lock beads on the circumference of the flared flange.

From the section shown in FIG. 3b two of the three cylinder pins 51 for the formation of the rotation locking beads can be seen on the periphery of the flange edge 15 (FIG. 3a), wherein the axes of the cylinder pins lie in the surface of a cone sheath, which is arranged rotationally symmetric to the thread axis 36. Here, one of the cylinder pins 51 can be seen in its full length, while another cylinder pin 51 is only partially recognizable.

After the actual pressing operation, a function test of the temperature sensor 7 is performed using the test contacts 54, 55 of the pressing tool, whereby due to the pressing operation and the function test using the test contacts, a simple combination of manufacturing process and test is obtained.

After the pressing and monitoring operation, the pressing tool 50 is removed from the sensor 7 along the thread axis 36, so that the actual sensor is now present as a complete component, provided the function test has run successfully using a test unit (not shown here).

The sensor housing 12 is preferably made of stainless steel or brass, wherein the properties of the medium to be measured are considered in the selection of material. The actual connection piece 4 is preferably made of polyamide (with the exception of the plugs 33, 34).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A sensor for detecting a temperature of a fluid in the hollow space of a housing, comprising a temperature measuring element (1') connectable to an evaluation device via a plug arrangement and arranged in a protective tube (11) of a sensor housing (12), which is closed on one end, and a connection piece firmly attached to the sensor housing (12), the protective tube (11) being adapted to project at least with its tip into an opening of the hollow space-housing where it can be sealed off from outside atmosphere using an elastic O-ring, wherein the measuring element (1') is a surface-mountable component (SMD), which is arranged in a tip region of the protective tube (11) and connected to contact pads (45,46) on one end of a longitudinally extending circuit board (2), wherein the contact pads (45,46) are connected via strip conductors to the plug arrangement positioned on an opposite end of the circuit board, wherein the plug arrangement is surrounded by a screw sheath (3) of the sensor housing (12), which is firmly connected to the protective tube (11) and which is provided with a threading (13) adapted to project into the hollow space-housing for purposes of mounting, the screw sheath (3) having a flange (14) extending in a radial direction, which provides a press-on surface for an O-ring for sealing off an opening of the hollow space-housing.

2. The sensor according to claim 1, wherein the screw sheath (3) is provided with an annular edge (15) arranged coaxially to the threading, on a side of the sheath (3) facing away from the protective tube (11), for attaching the connection piece (4).

3. The sensor according to claim 2, wherein the connection piece (4) is stopped in its plug-in position against axial shifting by an annular flange of the edge (15).

4. The sensor according to claim 1, wherein the connection piece (4) is secured against turning relative to the screw sheath (3) of the sensor housing (12) by locking beads and/or recesses.

5. The sensor according to claim 1, wherein the measurement element (1') is embedded in heat-conducting paste.

6. The sensor according to claim 1, wherein the measurement element (1') is constructed as a temperature-dependent resistor.

7. The sensor according to claim 1, wherein the sensor is adapted for measuring a temperature in a flowing liquid or gaseous medium.

* * * * *